United States Patent [19]
Telehowski et al.

[11] Patent Number: 5,806,913
[45] Date of Patent: Sep. 15, 1998

[54] COCKPIT COVER A CONVERTIBLE MOTOR VEHICLE

[75] Inventors: Stephen G. Telehowski, Canton; Sandy J. Emerling, Troy; Keijo J. Huotari, Woodhaven, all of Mich.

[73] Assignee: Chrysler Corporation, Auburn Hills, Mich.

[21] Appl. No.: 964,434

[22] Filed: Nov. 4, 1997

[51] Int. Cl.⁶ ..................................................... B60J 11/00
[52] U.S. Cl. .............................................................. 296/136
[58] Field of Search ............................................. 296/136

[56] References Cited

U.S. PATENT DOCUMENTS

| | | | |
|---|---|---|---|
| 2,638,378 | 5/1953 | Molinaro | 296/136 |
| 4,971,385 | 11/1990 | Lazarevich | 296/136 |
| 4,998,766 | 3/1991 | Biermacher et al. | 296/136 |
| 5,201,565 | 4/1993 | Berardino | 296/136 |
| 5,267,774 | 12/1993 | Garner et al. | 296/218 |
| 5,322,337 | 6/1994 | Rawlings et al. | 296/136 |

FOREIGN PATENT DOCUMENTS

| | | | |
|---|---|---|---|
| 3812469 | 10/1989 | Germany | 296/136 |
| 2049571 | 12/1990 | United Kingdom | 296/136 |

*Primary Examiner*—Gary C. Hoge
*Attorney, Agent, or Firm*—Mark P. Calcaterra

[57] ABSTRACT

A cockpit cover for a convertible vehicle comprising a sheet of pliable material shaped to cover the cockpit. A first lever is provided on a first edge portion of the sheet and a second lever is provided on a second edge portion of the sheet. Connectors are provided for the respective first and second levers to pull the lever toward the vehicle cockpit.

12 Claims, 7 Drawing Sheets

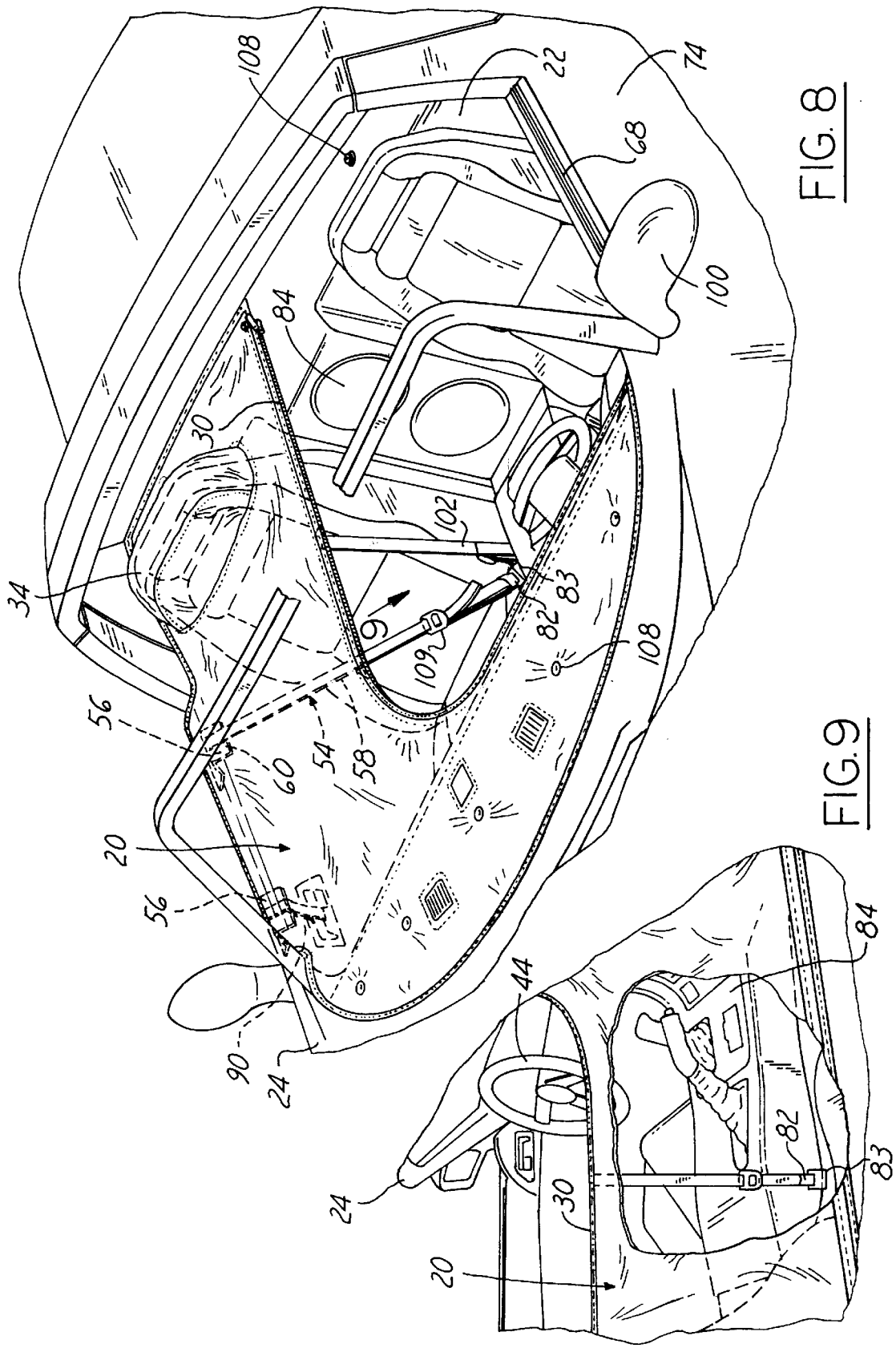

5,806,913

COCKPIT COVER A CONVERTIBLE MOTOR VEHICLE

FIELD OF INVENTION

This invention relates generally to a cockpit cover for a convertible motor vehicle, and more particularly to a securing system for the cockpit cover.

BACKGROUND OF THE INVENTION

Attaching the typical cockpit cover over the cockpit of a convertible vehicle is difficult and time consuming, particularly when many snap connectors must be aligned and snapped in place. Moreover, the use of snap connectors on the exterior of the vehicle adjacent painted surfaces can result in scratched paint. What is needed is a securing system which is fast and simple to operate and provides a more secure attachment for the cover than other systems now in use. A further need exits for such a system which eliminates the use of snap type connectors adjacent painted surfaces and which obviates modifications or additions to the vehicle which could create styling concerns.

SUMMARY OF THE INVENTION

In accordance with the present invention, a cockpit cover for a convertible vehicle is provided, comprising a sheet of pliable material shaped to cover the cockpit. A first lever is provided on a first edge portion of the sheet and a second lever is provided on a second edge portion of the sheet. Connectors are provided for the respective first and second levers to pull the levers toward the vehicle cockpit.

More specifically, the first edge portion of the sheet is alignable with a first hollow side portion of the vehicle and the second edge portion of the sheet is alignable with a second hollow side portion of the vehicle. A first tongue is provided on the first edge portion of the sheet which is insertable within the first hollow side portion. A second tongue on the second edge portion of the sheet is insertable within a second hollow side portion of the vehicle. The tongues may be portions of the levers previously described. The first and second connectors are connected to the tongue to anchor the tongues within the hollow side portions of the vehicle. Preferably, at least one of the connectors may comprise a strap attachable to an anchor of a belt assembly. Another connector may be attached to an edge portion of the cover and engage a rear view mirror assembly of the vehicle. Still another connector may be attached to an interior door handle of the vehicle.

One object of this invention is to provide a cockpit cover and securing system for a convertible motor vehicle having the foregoing features and capabilities which substitutes levers for a series of snap connectors.

Another object is to provide a cockpit cover and securing system which is composed of a relatively few simple parts, is rugged and durable in use, and is capable of being inexpensively manufactured and easily installed over the cockpit.

These and other objects, features and advantages of the invention will become more apparent as the following description proceeds, especially when considered with the accompanying drawings.

BRIEF DESCRIPTION OF THE DRAWINGS

FIG. 8 is an enlarged, fragmentary perspective view showing one portion of the cockpit cover installed and the other portion removed.

FIG. 9 is a fragmentary perspective view taken in the direction of the arrow 9 in FIG. 8.

DETAILED DESCRIPTION OF THE PREFERRED EMBODIMENTS

Figure 10:
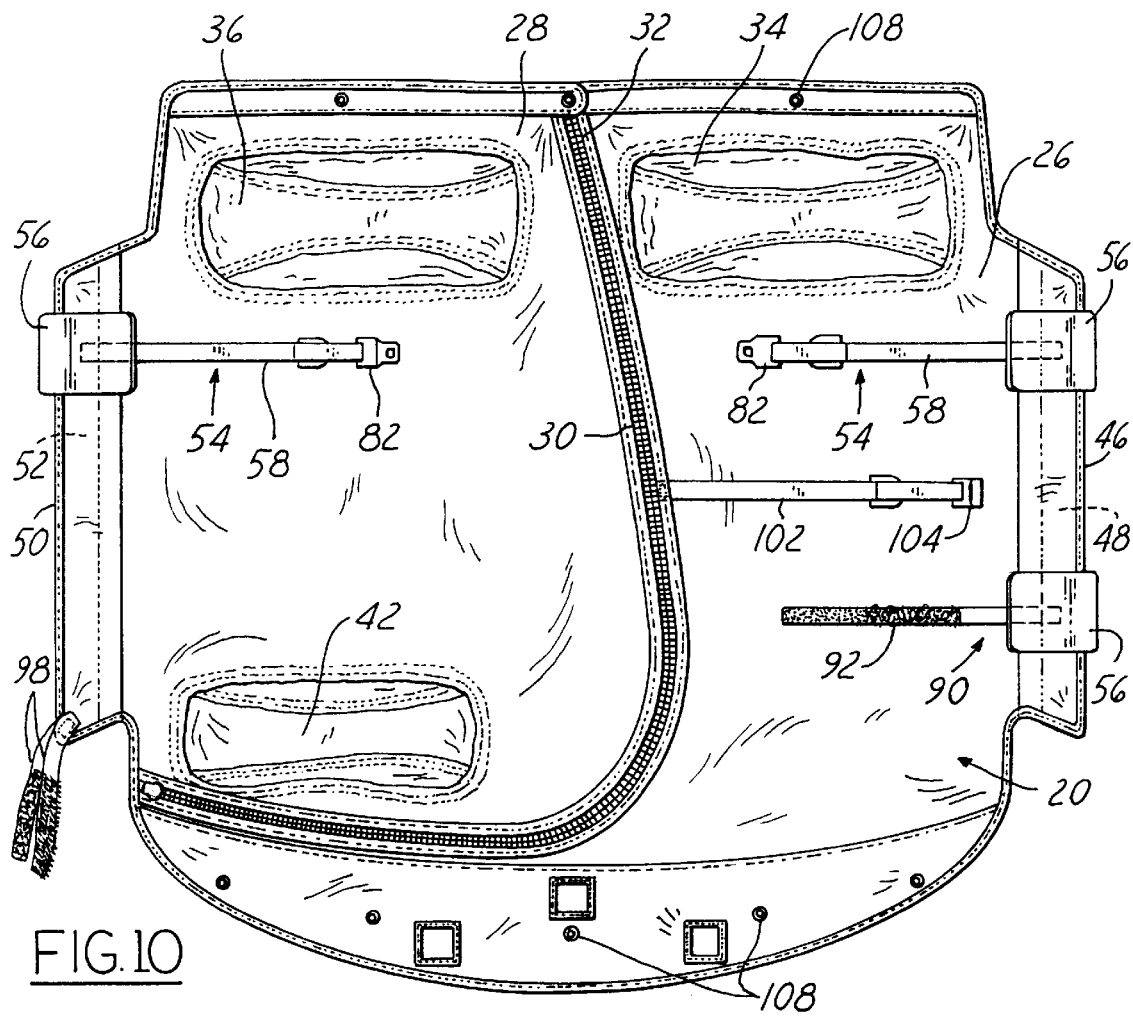
FIG. 10 is a bottom view of the cockpit cover.

Referring now more particularly to the drawings, a cockpit cover 20 is shown covering the cockpit 22 of a convertible motor vehicle 24. The cover 20 is in the form of a sheet of flexible pliable material such as a suitable waterproof cloth or plastic, for example, and is in two parts, namely, a first body portion 26 and a second body portion 28. The body portions 26 and 28 are removably attached to one another along a seam line 30 by a zipper 32. The outline of the cover when laid flat is best seen in FIG. 10. This view shows that there are pockets 34 and 36 in the body portions 26 and 28 to receive the top portions of the two seat backs 38 and 40, and a pocket 42 to receive the top of the steering wheel 44.

Figure 4:
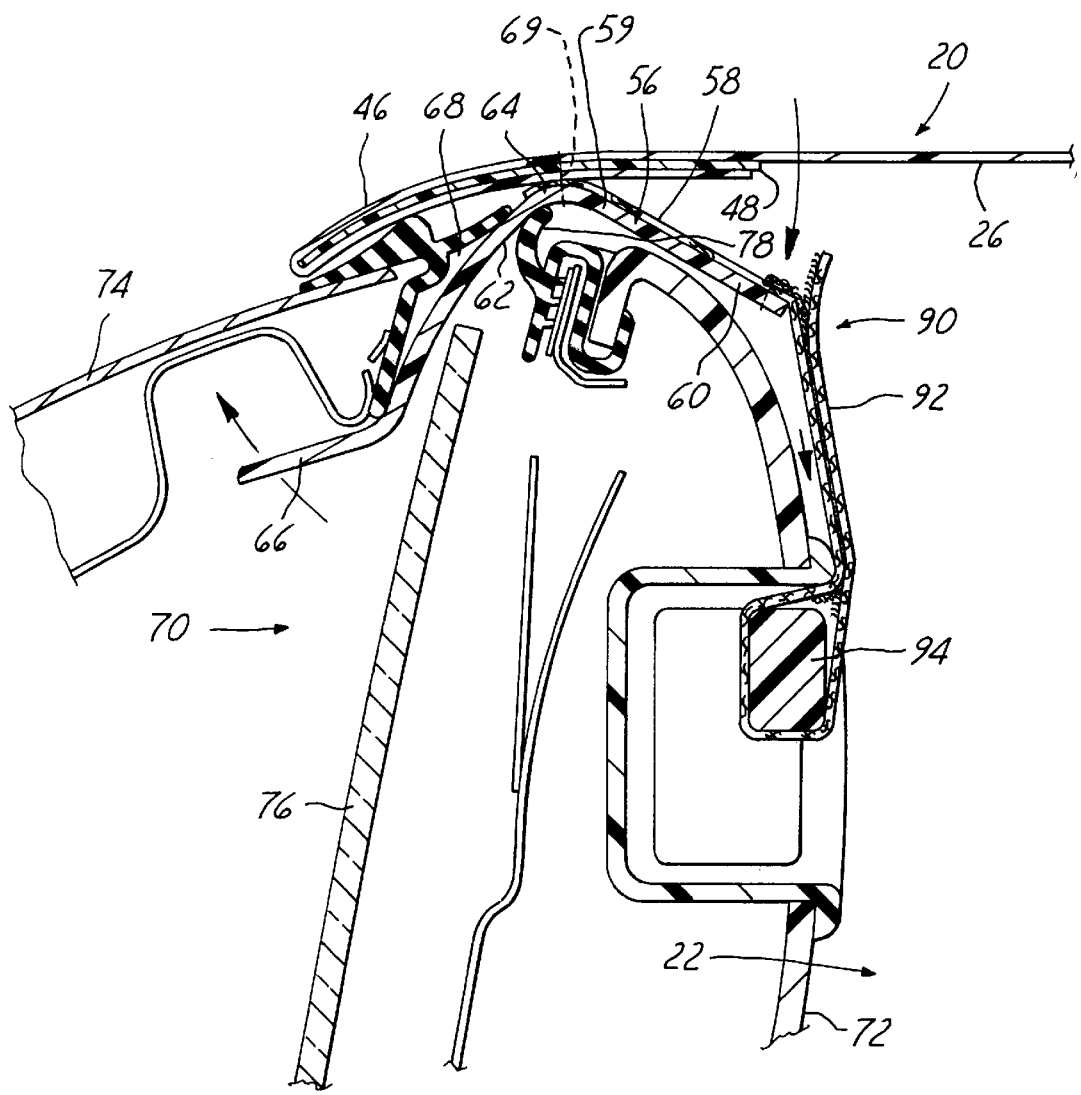
FIG. 4 is a sectional view taken on the line 4—4 in FIG. 3.

One side edge portion 46 of the cover is folded over on itself and has a semi-rigid stiffening member 48 of plastic sheeting or the like within the fold (See FIGS. 4 and 10). The opposite side edge portion 50 of the cover is folded over on itself and has a stiffening member 52 secured within the fold.

Strap attachments 54 are provided to secure the opposite side edge portions of the cover to the vehicle. Each attachment 54 comprises a lever 56 and an elongated, flexible strap 58 which is adjustable in length. The lever 56 is a relatively stiff tab, the configuration of which is best seen in FIG. 4. As there shown, the lever 56 has a main body portion 59 which is of generally inverted V-shape when in the installed position, having a strap-attaching inner end portion or arm 60 and a tongue 62 which form a fulcrum 64 at the curved apex of the V. The tongue 62 has an upwardly bent terminal portion 66.

The lever 56 is pivotally attached to the cover 20 by a row of stitching 69 extending through both layers of the fold of the body portion of cover 20, through the intervening stiffening member 48, and through lever 56 adjacent fulcrum 64. The tongue 62 is insertable through the slot 68 at the top of a window opening in the hollow side portion 70 of a door of the vehicle, between the inner and outer door panels 72 and 74 and down alongside the upper edge of a retracted window 76 when the edge portion of the cover is aligned with the slot 68. The fulcrum 64 of the lever is secured to the bottom of a side edge portion of the cover and when installed as in FIG. 4 rests on a sealing strip 78 at the top of the window opening.

Figure 5:
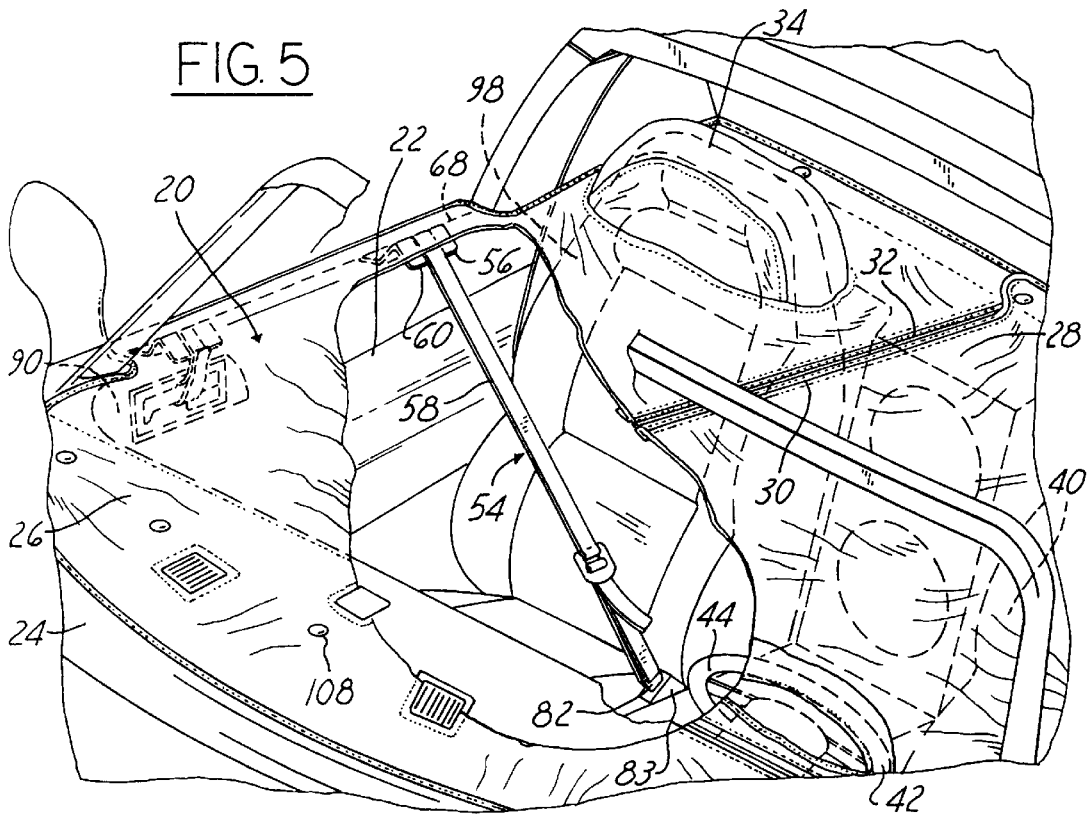
FIG. 5 is an enlarged, fragmentary perspective view taken in the direction of the arrow 5 in FIG. 1, with parts broken away.
Figure 6:
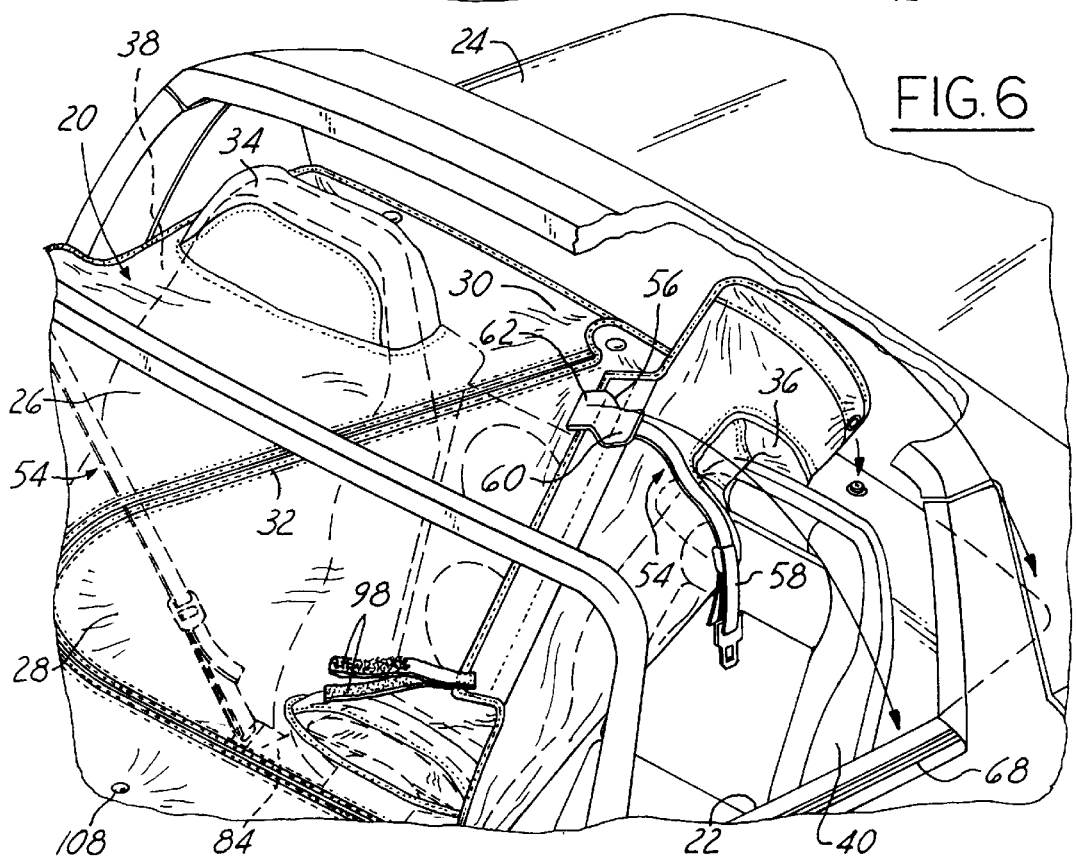
FIG. 6 is an enlarged, fragmentary perspective view taken in the direction of the arrow 6 in FIG. 1, with parts broken away and showing the cover in the process of installation.
Figure 11:
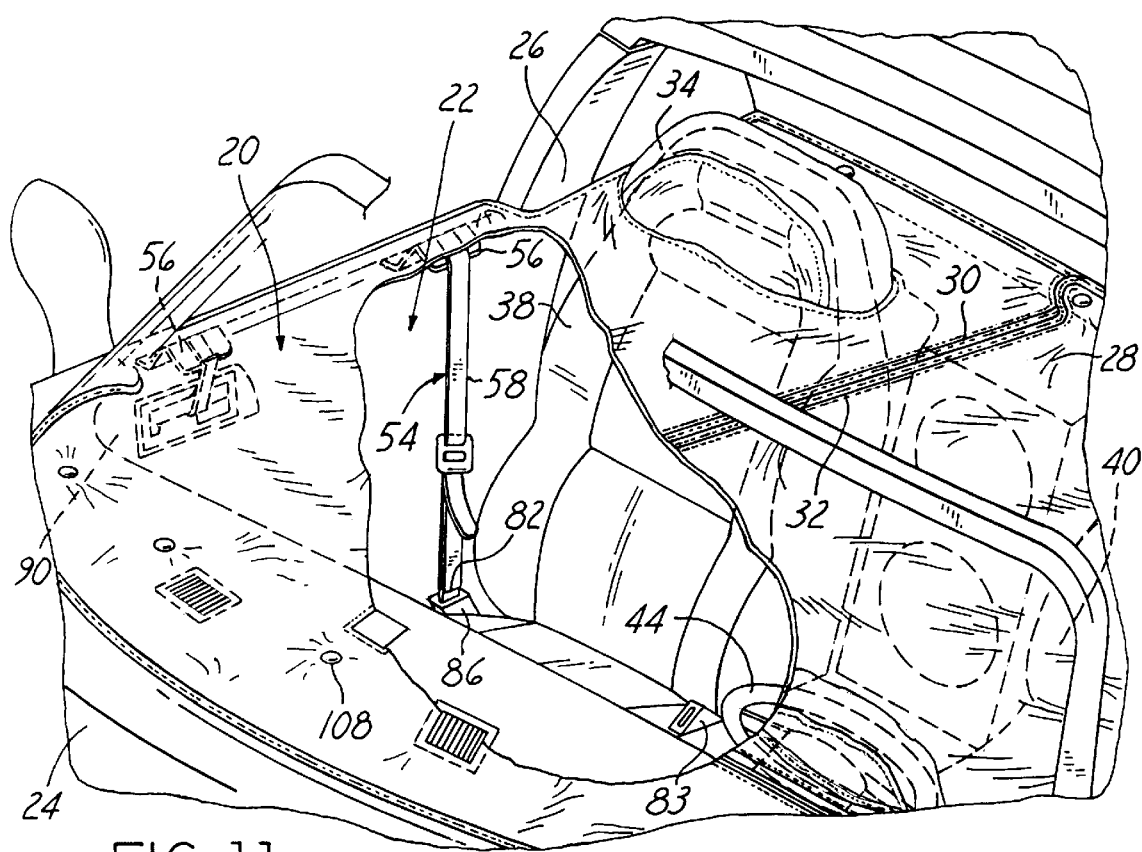
FIG. 11 is a perspective view similar to FIG. 5, but showing one of the straps attached to a different seat belt anchor.

As shown in FIG. 5, one end of the strap 58 is secured to the inner end portion 60 of the lever 56 and the other end has a buckle 82 of the type adapted to engage the anchor 83 of a seat belt assembly. As shown in FIG. 10, there are two such strap attachments 54, one for each side portion of the cover. In FIGS.1, 5, 6 and 8 the buckles 82 on the ends of the straps 80 are releasably snapped into the seat belt anchors 83 adjacent to the center console 84. In FIG. 11, the buckle on the strap on the passenger side of the vehicle is shown releasably snapped into a seat belt anchor 86 adjacent to the passenger side door. The same arrangement may also be provided on the driver's side.

Figure 1:
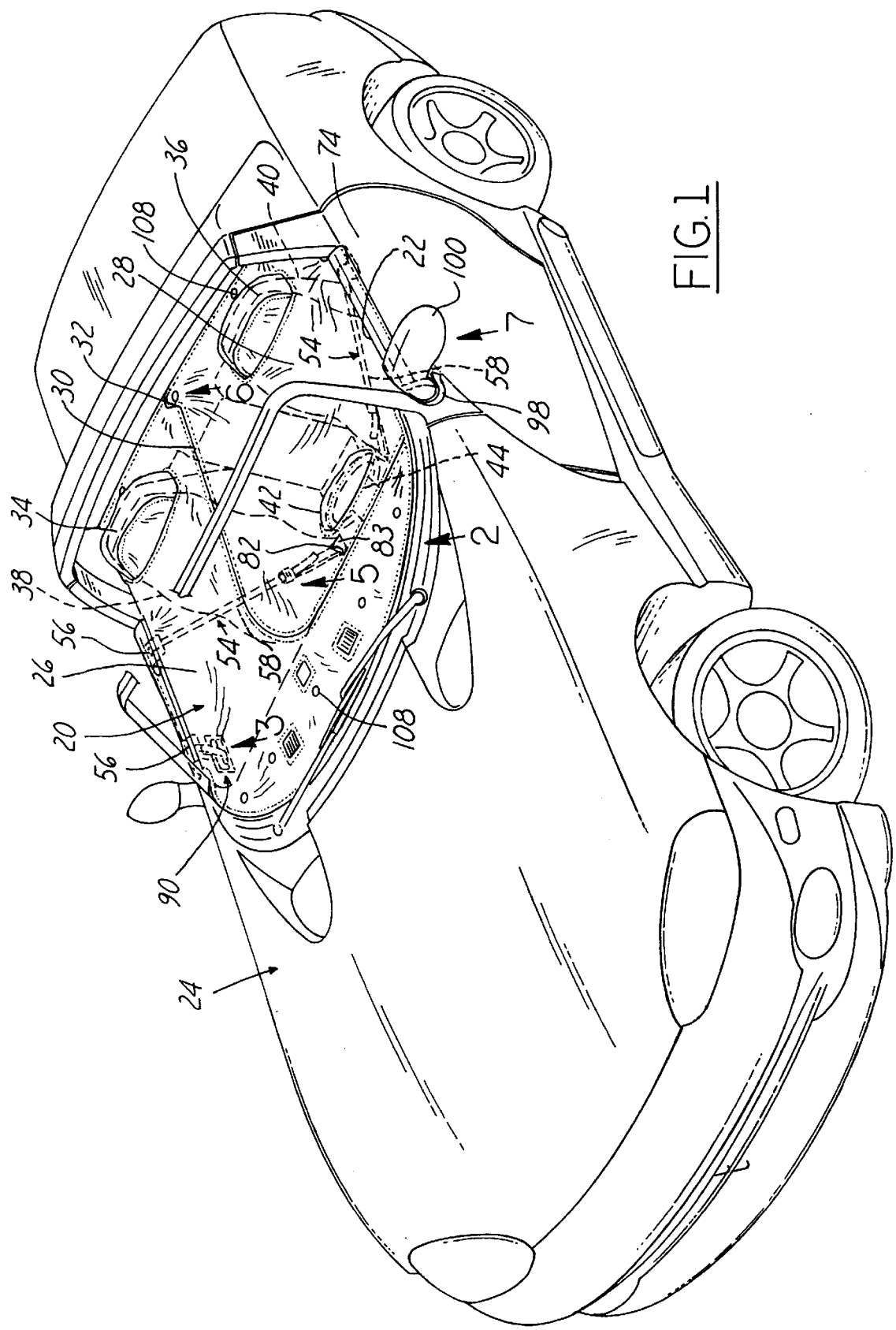
FIG. 1 is a perspective view showing a cockpit cover installed over the cockpit of a convertible motor vehicle.
Figure 2:
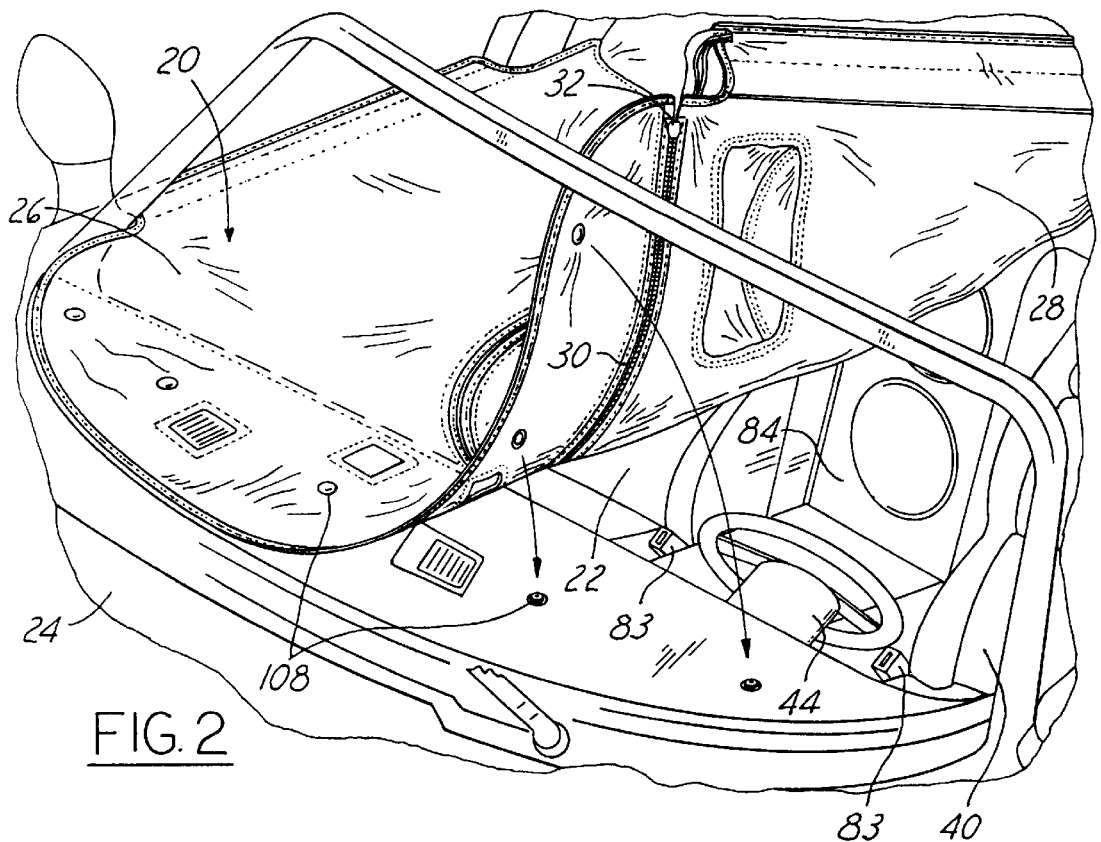
FIG. 2 is an enlarged, fragmentary perspective view taken in the direction of the arrow 2 in FIG. 1, showing the cockpit cover in the process of being installed over the cockpit of the vehicle.
Figure 3:
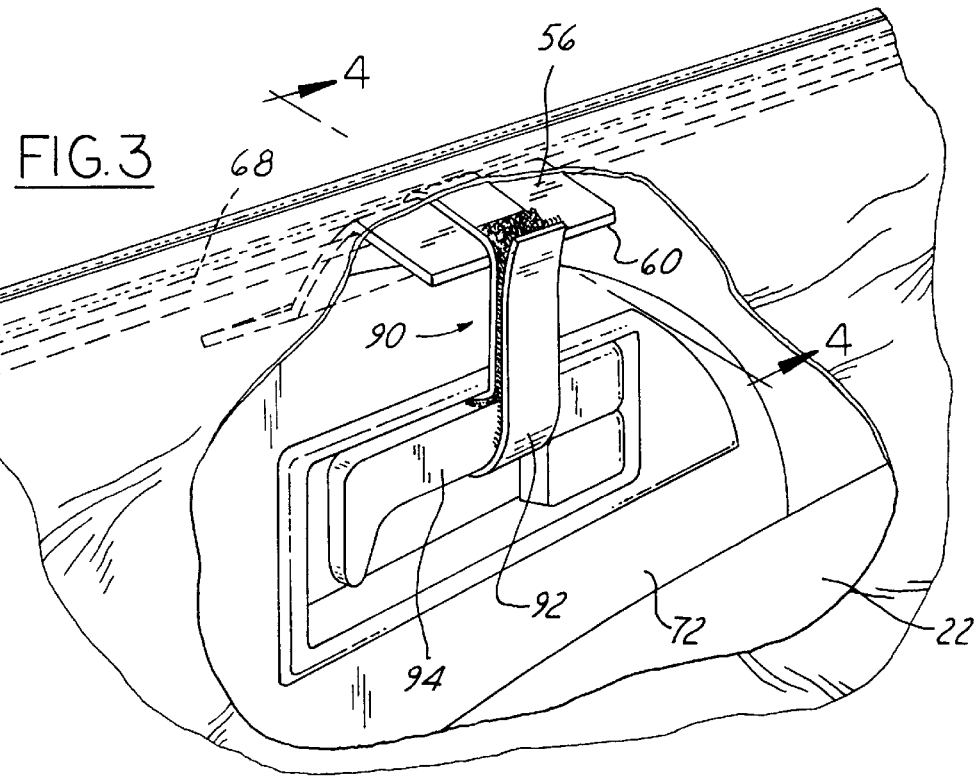
FIG. 3 is an enlarged fragmentary perspective view taken in the direction of the arrow 3 in FIG. 1, with part of the cover broken away.
Figure 4A:
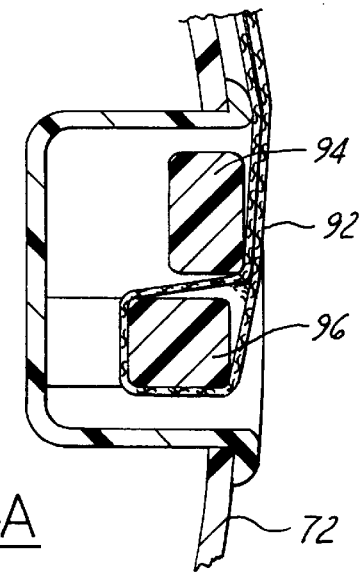
FIG. 4A is a sectional view similar to FIG. 4 but showing a different attachment.

To further secure the cover over the cockpit, an attachment 90 is provided on the passenger side of the cover. (See FIGS. 3, 4 and 10). The attachment 90 consists of a lever 56 and an elongated, flexible strip 92 of the hook and loop type commonly referred to as a Velcro strip. The strip 92 is secured to the inner end portion 60 of the lever and is adapted to loop under a handle 94 on the door and be folded back on itself so that the Velcro surfaces of the strip provide a releasable connection. In FIGS. 3 and 4, the handle 94 is in the form of a release lever for the door latch. FIG. 4A shows a modification in which the strip 92 loops under a fixed door pull 96 just beneath the lever 94.

Figure 7:
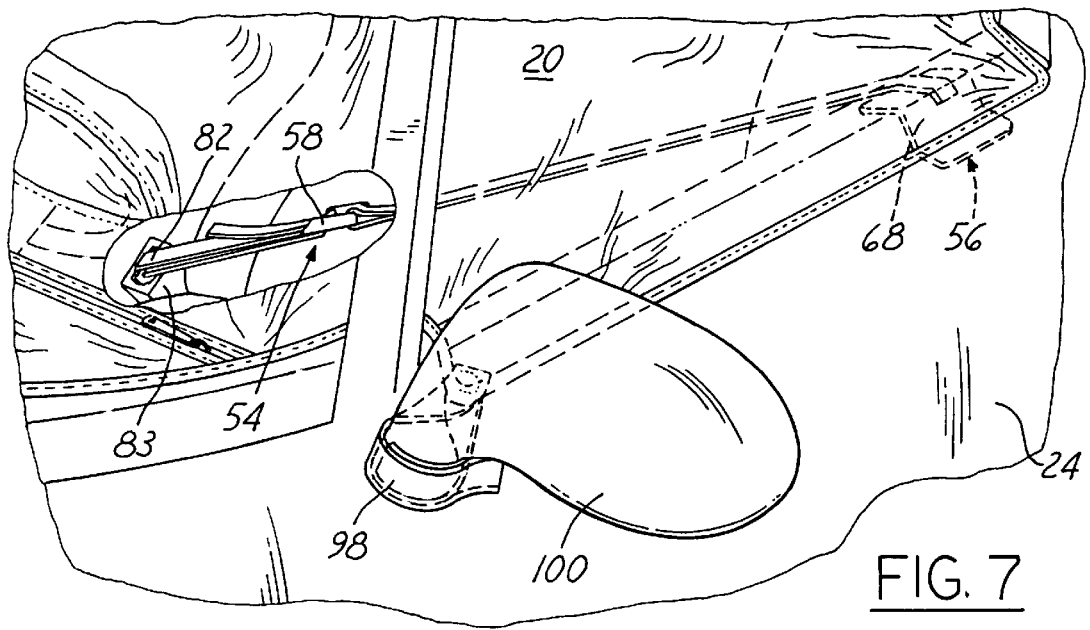
FIG. 7 is an enlarged, fragmentary perspective view taken in the direction of the arrow 7 in FIG. 1.

As shown in FIGS. 7 and 10, for additional securement on the driver's side of the cover, two elongated, flexible Velcro-type strips 98 are secured at one end to the adjacent side edge portion of the cover and are adapted to extend around a side view mirror 100 on the door at the driver's side and their opposite ends releasably secured together.

Additional securement along the seam line 30 between the two body portions 26 and 28 of the cover includes an elongated, flexible strap 102 of adjustable length having one end permanently secured to the body portion 26 and a buckle or hook 104 on the opposite end releasably engageable in an inner seat belt anchor or hooked under the lower edge of the center console 84 (See FIGS. 8 and 10).

If desired, snap fasteners 108 may be provided along the front and rear edge portions of the cover to releasably engage mating snap fastener parts on the instrument panel and at the rear of the cockpit but removed from the painted door surfaces adjacent the levers 56.

The entire cover may be installed over the cockpit or, if desired, only the body portion 26 may be installed as in FIG. 8 so that the driver's seat can be occupied. The tension on the strap attachment 54 may be adjusted by adjusting the length of the strap with a conventional buckle 109 (FIG. 8). This tension will determine the pulling force applied to the levers 56 and provide adequate anchoring force by the abutment of tongue 62 against the interior of the door panels.

What is claimed is:

1. A cockpit cover for a convertible vehicle, comprising:

a sheet of pliable material shaped to cover a vehicle cockpit, said sheet having a first edge portion and a second edge portion opposed to said first edge portion;

a first lever provided on said first edge portion;

a second lever provided on said second edge portion; and first and second connectors respectively provided on said first and second levers for pulling said levers toward said vehicle cockpit.

2. The cover of claim 1, wherein each of said first and second levers comprises a tongue portion, an arm portion and a fulcrum portion disposed between said tongue portion and said arm portion.

3. The cover of claim 1, wherein said first and second levers are pivotally connected to said sheet.

4. The cover of claim 2, wherein each of said first and second connectors comprises a strap.

5. The cover of claim 1, and further comprising a first stiffening member extending along and stiffening said first edge portion and a second stiffening member extending along and stiffening said second edge portion.

6. The cover of claim 1, wherein said sheet comprises a first body portion and a second body portion removably attached to said first body portion along a seam line, and further comprising a third connector attached to said first body portion adjacent said seam line.

7. A cover for covering the cockpit of a convertible vehicle having a rear view mirror assembly, a first hollow side portion including an interior handle, a second hollow side portion and a seat belt assembly and wherein said cover comprises:

a sheet of pliable material shaped to cover said cockpit, said sheet having a first edge portion alignable with said first hollow side portion, and a second edge portion alignable with said second hollow side portion;

a first tongue provided on said first edge portion and insertable within said first hollow side portion;

a second tongue provided on said second edge portion and insertable within said second hollow side portion; and first and second connectors respectively connected to said first and second tongues for anchoring said first and second tongues within said first and second hollow side portions.

8. The cover of claim 7, wherein at least one of said first and second connectors comprises a seat belt attachment member for attaching at least one of said first and second connectors to said seat belt assembly.

9. The cover of claim 7, and further comprising a third connector attached to said first edge portion of said cover and engageable with said rear view mirror assembly.

10. The cover of claim 7, and further comprising a third tongue provided on said first edge portion and insertable within said first hollow side portion, and a third connector interconnected to said third tongue and attachable to said interior handle.

11. The cover of claim 10, wherein said interior handle is a door-latch release lever.

12. The cover of claim 10, wherein said interior handle is a fixed door pull.

* * * * *

UNITED STATES PATENT AND TRADEMARK OFFICE
CERTIFICATE OF CORRECTION

PATENT NO.   : 5,806,913
DATED        : September 15, 1998
INVENTOR(S)  : Telehowski, et al.

It is certified that error appears in the above-identified patent and that said Letters Patent is hereby corrected as shown below:

On the title page, item [54], after "Cover" insert --For--.

Signed and Sealed this

Third Day of August, 1999

Attest:

Q. TODD DICKINSON

Attesting Officer

Acting Commissioner of Patents and Trademarks